March 25, 1969 P. K. BEATENBOUGH ET AL Re. 26,550

CROSSFLOW RADIATORS

Original Filed April 9, 1963

INVENTORS
Paul K. Beatenbough &
BY Robert W. Bishop
George E. Johnson
ATTORNEY

United States Patent Office

Re. 26,550
Reissued Mar. 25, 1969

26,550
CROSSFLOW RADIATORS

Paul K. Beatenbough, Medina, and Robert W. Bishop, Lockport, N.Y., assignors to General Motors Corporation, Detroit, Mich., a corporation of Delaware Original No. 3,275,070, dated Sept. 27, 1966, Ser. No. 271,743, Apr. 9, 1963. Application for reissue July 28, 1967, Ser. No. 661,148
Int. Cl. F28b *9/10, 3/00;* F28d *1/02*
U.S. Cl. 165—111 4 Claims

Mattter enclosed in heavy brackets [ ] appears in the original patent but forms no part of this reissue specification; matter printed in italics indicates the additions made by reissue.

*ABSTRACT OF THE DISCLOSURE*

*A crossflow radiator in an automotive engine cooling system so constructed that sole expansion space as defined within the system for liquid coolant is in one tank of the radiator.*

This invention refers to heat exchangers and more particularly to a radiator of the crossflow type adapted to serve an internal combustion engine, and also to a combination of such a radiator with a liquid cooled internal combustion engine.

Crossflow radiators have been used for many years. One reason for the continued efforts to use them is that they permit lower installation in vehicles as compared with the more conventional downflow type. Heretofore, however, such radiators have been generally unacceptable. Expensive provisions for air removal and supplementary coolant reserve tanks have been employed with crossflow radiators to insure that the radiator tube outlets are maintained full of engine coolant at all times. A common and basic difficulty has been that, as coolant is heated, it expands and some of it is lost through an overflow port. As the coolant subsequently cools and contracts, air is drawn into the system through the overflow port or a vacuum valve. If the air is not collected at the overflow zone, the cooling system will act like a pump to exhaust coolant with each heating and cooling cycle. In the teachings of the United States patents to Muir, 1,860,783, granted May 31, 1932 and 1,576,756, granted March 16, 1926, air vents are provided at the tops of outlet header tanks where air gathers but users of such radiators continually replaced coolant in vain attempts to maintain top tanks full. Providing top header tanks eliminated a main advantage (lower installation) of crossflow radiators and in the patented structures referred to, coolant loss is great because of the frequent refills referred to.

It has now been discovered that top or supplementary coolant reserve tanks are not necessary while the flow of coolant is maintained through all tubes in a crossflow radiator capable of stable and efficient performance—i.e.—an operation without the operator feeling it necessary often to check the coolant level.

To this end, an object of the present invention is to provide an improved crossflow radiator capable of efficient performance without the use of a top or added reserve supply tank. Another object is to provide an improved combination of an engine and a crossflow radiator.

A feature of the present invention is a crossflow radiator comprising a core with tubes connecting two side tanks, one of the latter being adapted to serve as a coolant inlet tank for receiving coolant and the other having means for removing air and being adapted to serve as a coolant outlet tank, the air removing means being above the outlet and the coolant capacity of the radiator being sufficient to include a necessary reserve supply of coolant in the absence of a top or supplementary tank. Another feature is a combination of an engine and a crossflow radiator in which no reserve radiator tank in the form of a top, side or detached tank is employed.

These and other important features of the invention will now be described in detail in the specification and then pointed out more particularly in the appended claims.

Figure 1:
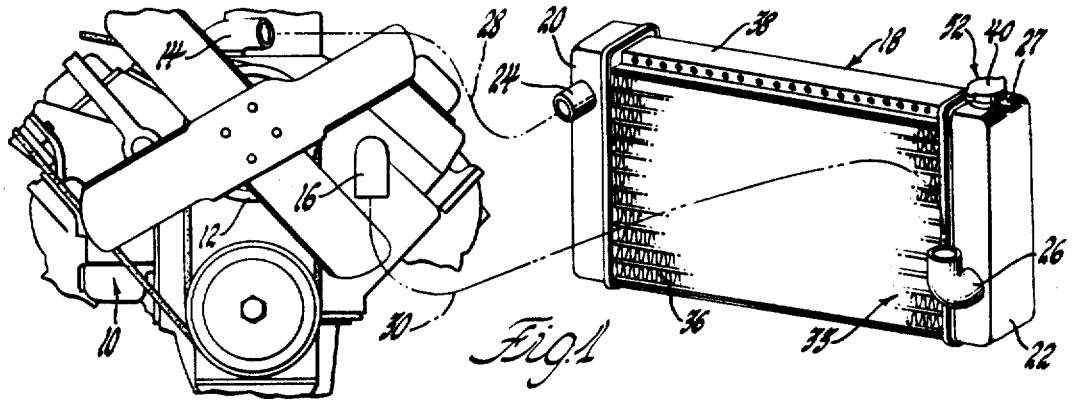
FIGURE 1 shows a front elevation of an automobile engine with a direct connection to a radiator being shown diagrammatically, the radiator being shown in perspective and the combination representing one embodiment of the present invention.
Figure 2:
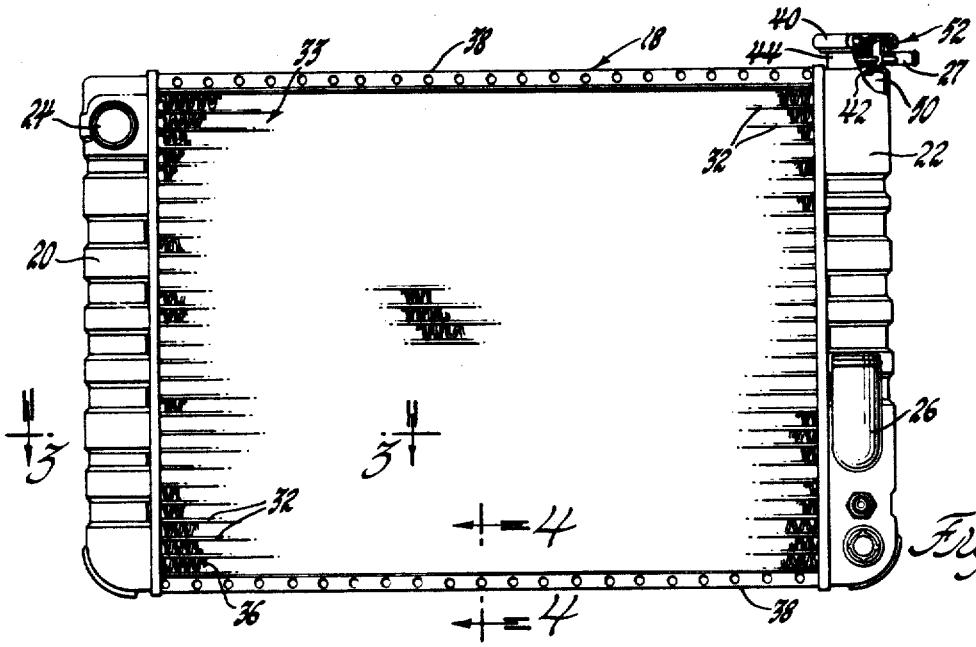
FIGURE 2 is an elevation view of the radiator shown in FIGURE 1 and drawn to a larger scale and with a portion broken away better to illustrate the invention.

In the drawings, a typical automobile V-8 engine is illustrated at 10. This engine is provided with a coolant pump 12 and a pump outlet flow connection 14 as well as a coolant jacket inlet connection 16. A crossflow radiator is depicted at 18. This radiator has two side tanks—an inlet tank 20 and an outlet tank 22. These two tanks are provided with an inlet 24 and an outlet 26 respectively. The inlet 24 is preferably but not necessarily located in the top portion of the inlet tank 20. The outlet 26 is preferably located in a low portion of the outlet tank 22 and is necessarily located below a vent connection 27 which communicates with a top portion of the outlet tank 22 as will further appear. The pump coolant outlet 14 and the radiator inlet 24 are directly connected by a conduit diagrammatically represented by a dotted line 28. The radiator outlet 26 and the engine jacket coolant inlet 16 are directly connected by a conduit diagrammatically represented by a dotted line 30. It will be noted that there are no supplementary tanks utilized in the cooling system of the illustrated combination of the engine 10 and the radiator 18.

Figure 3:
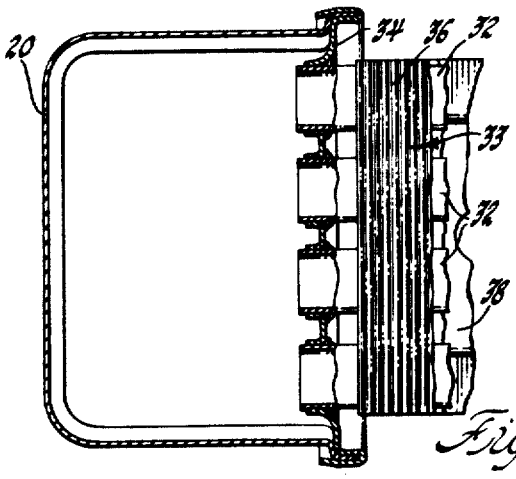
FIGURE 3 is a sectional view, drawn to a larger scale, looking in the direction of the arrows 3—3 in FIGURE 2.

In FIGURE 3, it is seen that horizontally extending tubes 32 of the radiator core 33 have ends passing through a tube sheet 34 and in communication with the inlet tank 20. Air centers 36 in the form of corrugated thin sheets of metal are utilized in a conventional manner between sets of adjacent rows of tubes 32 to enhance heat exchange characteristics of the radiator as is well known in the art. It will be also understood that the tubes 32 communicate with the outlet tank 22 in the same manner as depicted with relation to the inlet tank 20.

Figure 4:
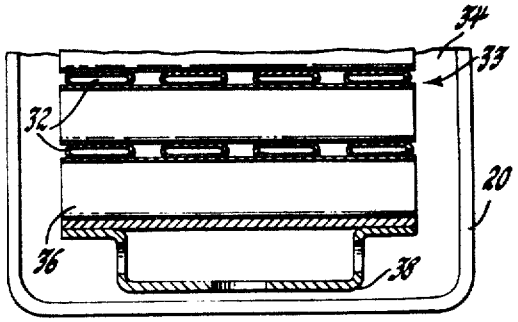
FIGURE 4 is a sectional view drawn to the same scale as FIGURE 3 and looking in the direction of the arrows 4—4 in FIGURE 2.

FIGURE 4 illustrates the relation of a radiator stiffening or frame structure 38 with respect to the core 33 with its air centers 36 and multiple flat tubes 32.

On the top of the outlet tank 22 is located a conventional pressure cap 40 which seats on a shoulder 42 within a radiator filler neck 44. It will be understood that when a predetermined pressure is exceeded in the radiator or cooling system, a spring of the pressure cap will compress and the radiator will be vented by way of the vent 27. A cap suitable for use in regulating the pressure is disclosed in the United States Patent 2,865,531 granted December 23, 1958 in the names of J. R. S. Gorst and S. W. Kemp.

In operation, engine coolant is forced by the pump 12 to flow through the conduit 28 and into the inlet tank 20. The coolant then flows horizontally through all the tubes 32 and is cooled by air flowing through the core 33 and by the fins or air centers 36. The air-cooled coolant then flows into the outlet tank 22 which defines an integrated, substantially unrestricted, or free flow zone 50 served by the outlet 26 and venting means generally indicated at 52 and including the closure 40 and the vent pipe 27. The air-coolant interface in the outlet tanks moves up and down in operation but this in no way interferes with the flow of coolant through the upper horizontal tubes 32. The zone 50 is sized to fit other proportions and dimensions of a given cooling system to permit the air-coolant interface to form. In a given design, if the flow rate were increased unduly, a condition would be reached at which the flow velocity in the zone 50 will sweep air along with it and thereby prevent air separation—i.e.—the flow velocity in a given installation must be low enough to permit entrained air to separate for venting and in the zone having the vent. The de-aerated coolant then returns directly to the jacket of the engine 10 by way of the conduit 30.

In the operation as above outlined, the cooling system depends upon pump pressure to force coolant through the radiator core 33 against the flow resistance of the latter. The cooling system is designed so that pump flow rate exceeds the gravity flow rate through the radiator (that is, the flow rate is such that the inlet tank 20 is maintained full of water). If this condition is met then flow occurs in only one horizontal direction through the radiator and through all radiator tubes 32 without regard to the location of the air-water interface in the outlet tank 22. The size and shape of the inlet tank 20 are immaterial considerations provided that the tank 20 is not so small as to throttle pump flow rate to an extent that the latter falls below the radiator gravity flow rate. Under the proper conditions described, air cannot separate in the inlet tank 20 since it will be swept therefrom and by way of the radiator core tubes to the separation zone 50. If the pump flow rate is permitted to fall below the radiator gravity flow rate, the system will continue to separate some air in the outlet tank but some air will also collect in the upper portion of the inlet tank and coolant flow will cease through those radiator tubes which are above the air-coolant interface in the inlet tank. With proper pump pressure and no undue throttling of flow between the pump 12 and the core 33, the system and radiator will operate in a stable and efficient fashion.

We claim:

1. A crossflow radiator comprising only two elongated tanks each having a vertical side, the said tanks being an inlet tank and an outlet tank, a core with tubes extending horizontally and connecting the vertical sides of said tanks to form flow passages leading from said inlet tank to said outlet tank, said inlet tank having a coolant inlet, said outlet tank having a coolant outlet, a pressure actuated air vent connected to atmosphere and located at the top portion of said outlet tank in free communication with tubes of said core, the horizontal cross sectional area within the said top portion of said outlet tank being clear and sufficiently large relative to the coolant flow rate through the said tubes to permit air to separate from said coolant upon the latter discharging from said tubes into said outlet tank, and the path for fluid defined by said two tanks and tubes being in only one horizontal direction.

2. A combination of an internal combustion engine coolant jacket with an engine coolant pump and a crossflow radiator forming a closed circulatory system, said radiator being an integral unit of only two tanks and a core with horizontally extending tubes, said tanks being separated by a space occupied by said core and having vertically elongated facing sides serving as tube sheets for said tubes, one of said tanks having a coolant inlet, conduit means in said system forming a direct connection between said jacket and pump to said coolant inlet, said conduit means defining a flow path of substantially constant cross section to give a substantially uniform flow rate along its length, the other of said tanks having a top portion defining a zone in free communication with said tubes and having a sufficiently large volume relative to the flow rate through the said tubes to permit air to separate from coolant discharged by said tubes, said other tank having a coolant outlet located below said zone and connected to other conduit means forming part of said system, a pressure actuated air vent connected to said zone, and the path for coolant flow defined by said radiator being in only one horizontal direction.

*3. A crossflow radiator in an internal combustion engine pressurized cooling system including a coolant pump, said radiator comprising a pair of elongated tanks, said tanks being an inlet tank and an outlet tank, a core with tubes extending horizontally and connecting the said tanks to form flow passages leading from said inlet tank to said outlet tank, said inlet tank having a coolant inlet, means connecting said pump to said coolant inlet, said outlet tank having a coolant outlet connected to a low portion thereof, fluid discharge pressure actuated valve means connected to the top portion of said outlet tank and in free communication with the discharge ends of the top tubes of said core, the horizontal cross sectional area of said top portion of said outlet tank being sufficiently large relative to the coolant flow rate through said tubes to permit air to separate from said coolant upon the latter discharging from said tubes into said top portion, and the said outlet tank being the only expansion tank in said pressurized system.*

*4. A crossflow radiator in an internal combustion engine pressurized cooling system including a coolant pump, said radiator comprising elongated tanks connected by horizontal tubes, one of said tanks having a coolant inlet, means connecting said inlet to said pump, the other of said tanks being a radiator outlet tank having a coolant outlet leading from a lower portion thereof and an expansion zone in the top thereof, pressure valve means associated with said outlet tank and connecting the said tubes and expansion zone to atmosphere for allowing fluid to escape from said system when the pressure in said zone rises to a predetermined level above atmosphere pressure, the horizontal cross sectional area within the said zone being clear and sufficiently large relative to the coolant flow rate through the said tubes to permit air to separate from said coolant upon the latter discharging from said tubes into said outlet tank, the said pump and radiator being so related that the pump flow rate exceeds the gravity flow rate of said radiator, said pressure valve means including vacuum valve means for allowing air to enter said system when the pressure therein falls below atmosphere pressure, and the said outlet tank defining the sole expansion zone in said pressurized system.*

(References on following page)

References Cited

UNITED STATES PATENTS

The following references, cited by the Examiner, are of record in the patented file of this patent or the original patent.

| | | | |
|---|---|---|---|
| 1,576,756 | 3/1926 | Muir | 165—111 |
| 1,674,689 | 6/1928 | Muir | 123—41.08 |
| 1,717,689 | 6/1929 | Hunt | 123—41.29 X |
| 2,537,694 | 1/1951 | Oaks | 123—41.54 X |
| 3,051,450 | 8/1962 | White et al. | 165—110 |
| 3,254,707 | 6/1966 | Ferguson | 165—110 |

| | | | |
|---|---|---|---|
| 2,139,395 | 12/1938 | Walker | 123—41.54 X |
| 3,077,927 | 2/1963 | White et al. | 165—110 X |

FOREIGN PATENTS

| | | |
|---|---|---|
| 1,291,617 | 3/1962 | France. |

LLOYD L. KING, *Primary Examiner.*

A. W. DAVIS, *Assistant Examiner.*

U.S. Cl. X.R.

165—153; 123—41.54